(12) United States Patent
Scarpitti et al.

(10) Patent No.: US 9,004,121 B2
(45) Date of Patent: Apr. 14, 2015

(54) TIRE INCLUDING A CONTINUOUS PRESSURE MEMBRANE

(75) Inventors: Anthony John Scarpitti, Akron, OH (US); Gary Robert Burg, Massillon, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 943 days.

(21) Appl. No.: 12/941,166

(22) Filed: Nov. 8, 2010

(65) Prior Publication Data
US 2012/0111470 A1    May 10, 2012

(51) Int. Cl.
| | | |
|---|---|---|
| B60C 9/14 | (2006.01) | |
| B60C 1/00 | (2006.01) | |
| B60C 5/01 | (2006.01) | |
| B60C 9/18 | (2006.01) | |
| B60C 15/00 | (2006.01) | |
| B60C 15/06 | (2006.01) | |
| B29D 30/72 | (2006.01) | |
| B60C 5/00 | (2006.01) | |
| B60C 9/02 | (2006.01) | |

(52) U.S. Cl.
CPC ............... *B29D 30/72* (2013.01); *B60C 15/06* (2013.01); *B60C 9/14* (2013.01); *B60C 5/01* (2013.01); *B60C 2015/0614* (2013.01); *B60C 2009/145* (2013.01); *B60C 2009/1828* (2013.01); *B60C 15/0603* (2013.01); *B60C 1/0041* (2013.01); *B60C 9/18* (2013.01); *B60C 5/007* (2013.01); *B60C 15/0018* (2013.01); *B60C 9/02* (2013.01); *B60C 2005/145* (2013.01); *B29D 2030/722* (2013.01)

(58) Field of Classification Search
CPC .. B60C 9/14; B60C 2009/145; B60C 1/0041; B60C 5/007; B60C 5/01; B60C 15/0603; B60C 15/06; B60C 2015/0614; B60C 15/0018; B60C 9/18; B60C 2009/1828
USPC .......... 152/196–198, 200, 548, 564, 452, 541, 152/543, 546, 547, 550, 526, 537
See application file for complete search history.

(56) References Cited

U.S. PATENT DOCUMENTS

| | | | | |
|---|---|---|---|---|
| 2,757,701 | A | * | 8/1956 | Henson ..................... 152/548 X |
| 3,256,922 | A | * | 6/1966 | McFee |
| 3,301,303 | A | * | 1/1967 | Travers ........................ 152/545 |

(Continued)

FOREIGN PATENT DOCUMENTS

FR         1.298.523       *   6/1962

OTHER PUBLICATIONS

English machine translation of French Patent 1.298.523, Jun. 4, 1962.*

(Continued)

*Primary Examiner* — Adrienne C Johnstone
(74) *Attorney, Agent, or Firm* — Wood, Herron & Evans, LLP

(57) ABSTRACT

Tire including a continuous pressure membrane. The tire includes a carcass, a rubber layer surrounding the carcass, and a belt. The carcass includes at least one continuous pressure membrane defining a generally U-shaped cross section. The pressure membrane includes a crown portion, a first sidewall portion, and a second sidewall portion connected with the first sidewall portion by the crown portion. The belt may be composed of at least one additional continuous pressure membrane adjacent the crown portion.

6 Claims, 5 Drawing Sheets

(56) References Cited

U.S. PATENT DOCUMENTS

| | | | |
|---|---|---|---|
| 3,508,988 A * | 4/1970 | Waller | |
| 4,044,811 A * | 8/1977 | Dudek et al. | |
| 5,837,077 A | 11/1998 | Kabe et al. | |
| 6,283,185 B1 | 9/2001 | Rivaton | |
| 6,467,518 B1 | 10/2002 | Clouet et al. | |
| 6,712,107 B2 | 3/2004 | Clouet | |
| 6,880,601 B2 * | 4/2005 | Potin | 152/547 X |
| 6,929,045 B1 * | 8/2005 | Ogawa | 152/545 X |
| 7,093,636 B2 * | 8/2006 | Kusumoto | 152/545 X |
| 7,658,216 B2 | 2/2010 | Valle et al. | |
| 2006/0289101 A1 | 12/2006 | Prost et al. | |
| 2009/0283194 A1 * | 11/2009 | Hashimoto et al. | |

OTHER PUBLICATIONS

Kirk-Othmer Encyclopedia of Chemical Technology, vol. 20, John Wiley & Sons, Inc., pp. 31-32, published online Mar. 24, 2006.*

Mechanics of Pneumatic Tires, Ed. Samuel Clark, US Department of Transportation, Aug. 1981, p. 216.*

* cited by examiner

TIRE INCLUDING A CONTINUOUS PRESSURE MEMBRANE

TECHNICAL FIELD

This invention generally relates to pneumatic tires used on passenger vehicles, and particularly to pneumatic tires having improved puncture resistance and methods of manufacturing such pneumatic tires.

BACKGROUND

In conventional pneumatic tires for passenger vehicles, the main internal structure or carcass of the tires includes a pair of beads and a plurality of plies wrapped from the first bead to the second bead to define a generally U-shaped cross-section. The plies are rubber-coated fabric cords composed of materials such as polyester. The plies are typically wrapped to extend either generally perpendicular to the pair of beads (as shown in FIG. 5 and referred to as a "radial" construction) or angled to the pair of beads (referred to as a "bias" construction). The plies define the primary structural component of a pneumatic tire and transfer forces from a tread of the tire to the beads and therefore the rims of the tire. Ply construction is well-known in the art and is generally successful for its intended purpose, which is to maintain the size and shape of the tire and transfer loads applied to the tire.

However, conventional tires constructed with plies suffer from certain drawbacks. For example, the tightly wrapped polyester cords typically define miniscule spaces or "rivet areas" between adjacent cords. These rivet areas comprise mostly rubber instead of polyester material and therefore have a lessened localized resistance to a puncturing force applied to the carcass as compared to the polyester cords. As a result, the entire carcass of a conventional tire defines a completely discontinuous puncture resistance which negatively affects the overall performance and durability of the tire.

Furthermore, the tire manufacturing process is complex in part because forming the carcass with plies is a complex process. The polyester cord forming the plies must be calendared, accurately wound about the pair of beads, and coated with rubber material. The winding of the plies typically requires an intricate piece of machinery to ensure that adjacent plies are contacting each other and to ensure that the ply angle with respect to the beads is maintained, whether the tire is a radial construction or a bias construction. Thus, the formation of the carcass significantly increases the amount of time required to manufacture a pneumatic tire.

There is a need, therefore, for an improved pneumatic tire that addresses these and other issues associated with conventional tires.

SUMMARY

In one embodiment of the invention, a pneumatic tire includes a carcass including at least one continuous pressure membrane with a generally U-shaped cross section when viewed in a circumferential perspective relative to an axis of rotation of the pneumatic tire. The pressure membrane includes a crown portion, a first sidewall portion, and a second sidewall portion connected to the first sidewall portion by the crown portion. The tire further includes a rubber layer surrounding the carcass. The rubber layer includes a tire crown with a tread. The tire also includes a belt disposed between the crown portion of the pressure membrane and the tread of the tire crown.

The pressure membrane may be composed of a polyester material, and more specifically from a high-modulus plasticized-type thin film polyester. The pressure membrane is a generally planar layer bent into the generally U-shaped cross-section. The generally planar layer has a first predetermined puncture resistance. The carcass may further include pairs of bead members disposed about first and second membrane ends defined by the first and second sidewall portions of the pressure membrane. The carcass does not include any plies in this embodiment.

In another embodiment, a pneumatic tire includes a carcass and belt assembly including at least two continuous pressure membranes with a generally U-shaped cross section when viewed in a circumferential perspective relative to an axis of rotation of the pneumatic tire. Each of the pressure membranes includes a crown portion, a first sidewall portion, and a second sidewall portion connected to the first sidewall portion by the crown portion. The tire further includes a rubber layer surrounding the carcass and belt assembly. The rubber layer includes a tire crown with a tread.

In yet another embodiment, a method of manufacturing a pneumatic tire includes extruding a thin film of polyester material to form a continuous pressure membrane. The continuous pressure membrane is bent into a generally U-shaped cross section when viewed in a circumferential perspective relative to an axis of rotation of the pneumatic tire, the pressure membrane including a crown portion, a first sidewall portion, and a second sidewall portion. The pressure membrane is then wrapped around the axis of rotation. The method further includes encasing the pressure membrane with a rubber layer. The rubber layer includes a tire crown with a tread.

DEFINITIONS

Figure 1:
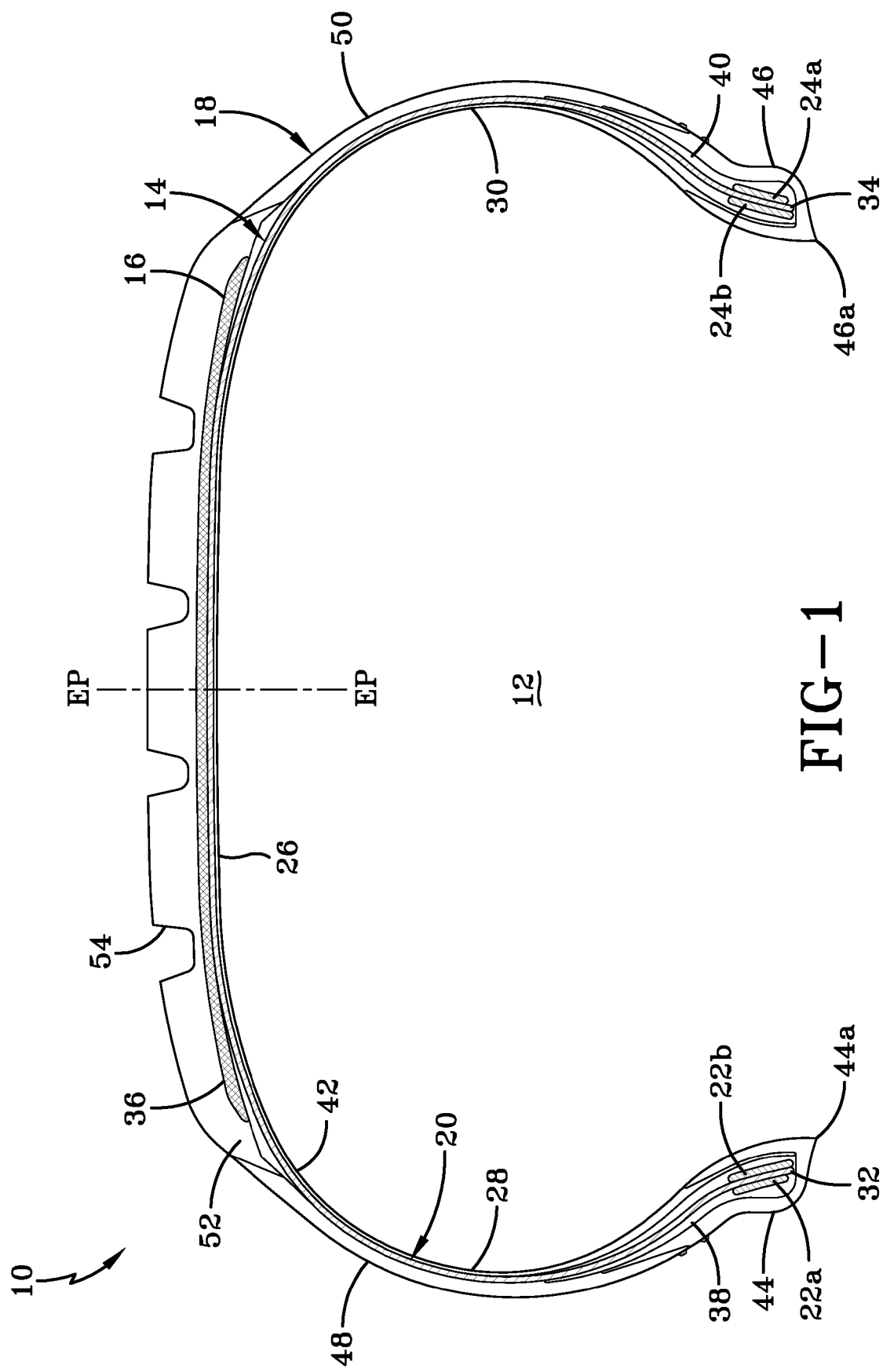
FIG. 1 is a front cross sectional view of a first embodiment of a pneumatic tire according to the invention.

"Air Chamber" means an annular pneumatic chamber defined between a tire and the rim when the tire is installed on the rim.

"Apex" means a generally molded rubber component disposed around the bead of a tire.

"Axial" means lines or directions that are parallel to the axis of rotation of the tire.

"Axially Inward" means in an axial direction toward the equatorial plane.

"Axially Outward" means in an axial direction away from the equatorial plane.

"Bead" means a circumferentially substantially inextensible metal wire assembly that forms the core of the bead area, and is associated with holding the tire to the rim.

"Carcass" means the tire structure apart from the belt structure, tread, undertread, and sidewall rubber over the plies, but including the beads.

"Chafer" means a molded abrasion-resistant outer component of the tire near the bead that minimizes abrasion at the interface between the tire and rim.

"Circumferential" means lines or directions extending along the perimeter of the surface of the annular tread perpendicular to the axial direction.

"End Portion" means a combination chafer and toe guard component of the tire, located around the bead.

"Equatorial Plane" (EP) means the plane perpendicular to the tire's axis of rotation and passing through the center of its tread.

"Inner" means toward the inside of the tire.

"Inner Liner" means a molded rubber layer covering the inner side of the carcass and facing the air chamber when the tire is assembled.

"Outer" means toward the exterior of the tire.

"Overlay" means a fabric material laid along an outer surface of the belts to stabilize the belts during operation.

"Ply" or "Plies" means a calendared fabric thread coated with rubber and wound between the beads to form the conventional carcass of a tire.

"Pneumatic Tire" means a laminated mechanical device of generally toroidal shape, usually an open torus, having beads and a tread and made of rubber, chemicals, fabric, and steel or other materials. When mounted on the wheel of a motor vehicle, the tire through its tread provides traction and contains the fluid that sustains the vehicle load.

"Pressure Membrane" means a structural membrane composed of a layer of material without the inclusion of plies, the layer of material being formed by extrusion of a film, for example.

"Radial" means lines or directions toward or away from the axis of rotation of the tire in the equatorial plane or in a plane parallel to the equatorial plane.

"Radially Inward" means in a radial direction toward the axis of rotation.

"Radially Outward" means in a radial direction away from the axis of rotation.

"Rivet Area" means a space between adjacent plies in a conventional carcass.

"Rubber Layer" means the tire structure apart from the belt structure and the carcass.

"Sidewall" means that portion of a tire between the tread and the bead area.

"Toe Guard" means a molded tear-resistant inner component of the tire near the bead that maintains the seal of the air chamber at the interface between the tire and rim.

"Tread" means a molded rubber component which includes the portion of the tire that comes into contact with the road when the tire is normally inflated and under normal load.

DETAILED DESCRIPTION

Figure 5:
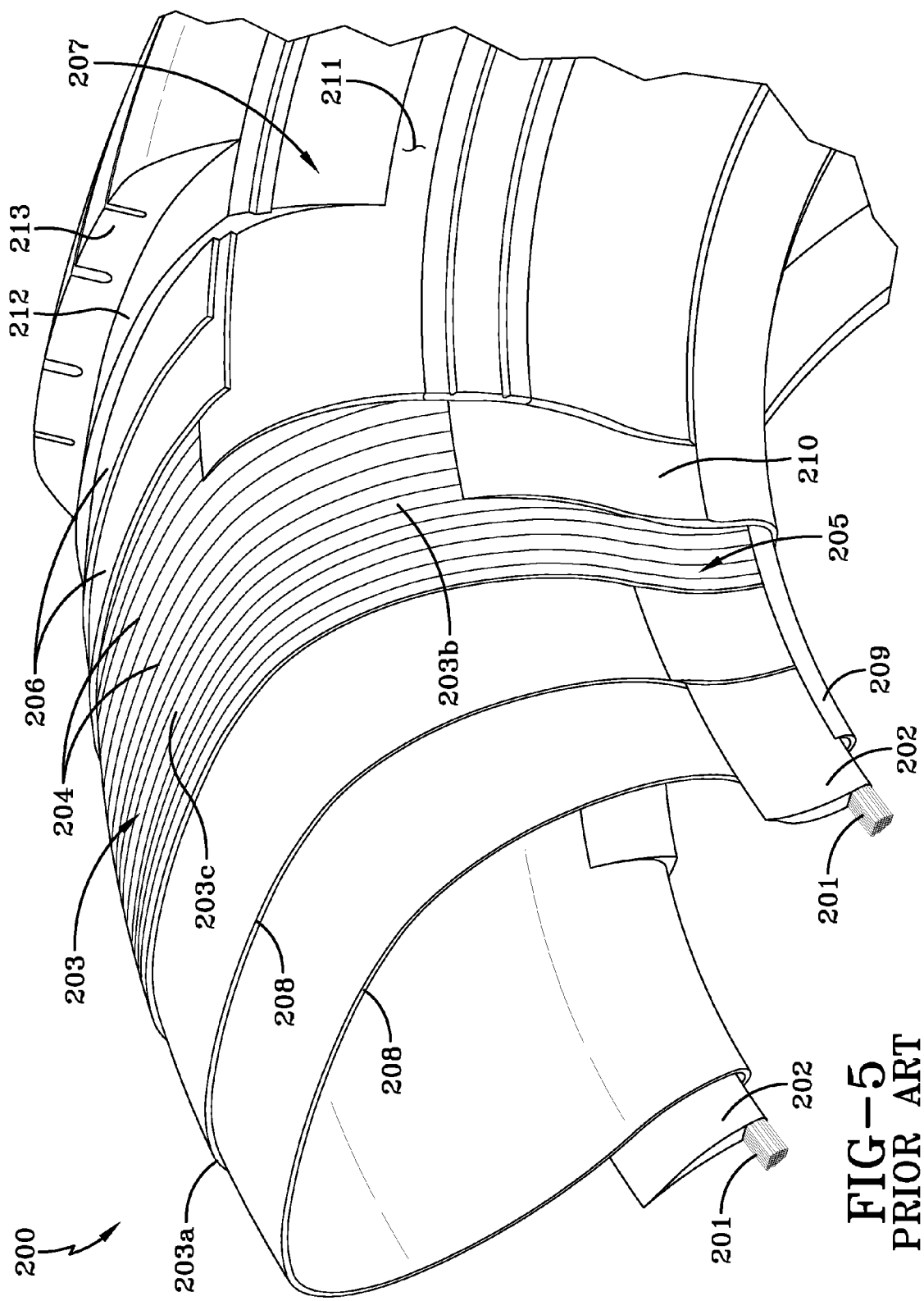
FIG. 5 is a perspective view of a conventional pneumatic tire having plies, the tire being cut away at various areas for illustrative purposes.

With reference to the figures, and more particularly to FIG. 5, a conventional pneumatic tire 200 having a radial ply construction is shown. The tire 200 includes a pair of beads 201 typically composed of bronze-coated steel wire with a hard rubber coating. An apex 202 of soft or hard rubber is formed around each of the beads 201 and then a plurality of plies 203 are wrapped around the pair of beads 201 in a generally perpendicular direction to the longitudinal extent of the beads 201. The plies 203 extend in a generally U-shaped cross section between the beads 201 to define a first sidewall portion 203a, a second sidewall portion 203b, and a crown portion 203c connecting the first sidewall portion 203a and the second sidewall portion 203b. The plies 203 are typically formed in one or two layers and include polyester cord that is rubber coated and defines rivet areas 204 between adjacent cords. The beads 201, apex 202, and plies 203 collectively define a carcass 205 of the conventional pneumatic tire 200. As previously described, the carcass 205 has a discontinuous resistance to puncture forces caused by the weaker rivet areas 204 defined between strong areas at the cords.

Once the carcass 205 is assembled, a belt 206 (two shown in FIG. 5) may be positioned radially outward from the plies 203 along the crown portion 203c to further increase the stiffness and strength of the tire 200. The belts 206 are typically composed of brass coated high tensile steel wire layered at opposing angles for each belt 206, but it is understood that other materials such as polyester may also be used to form the belts 206. The carcass 205 and belts 206 are then encased in a rubber layer 207 to complete the tire construction. The rubber layer 207 may be integrally formed, but is usually formed by a plurality of different rubber components as explained below.

The rubber layer 207 includes an inner liner 208 typically composed of bromobutyl or another butyl material and located radially inward from the crown portion 203c of the plies 203 and axially inward from the first and second sidewall portions 203a, 203b of the plies 203. A toe guard 209 and a chafer 210 composed of abrasion and tear resistant rubber are formed adjacent to the beads 201 to interface with the rim (not shown) of the tire 200 to define an air chamber within the rim and U-shaped cross section of the plies 203. First and second sidewalls 211 composed of flexible rubber are positioned axially outward from the first sidewall portion 203a and the second sidewall portion 203b of the plies 203. An overlay 212 of nylon fabric or rubber material is positioned radially outward from the belts 206 to surround the belts 206, and a tread 213 is formed radially outward from the overlay 212. The tread 213 is configured to engage the road surface and is composed of a rubber including an optimized combination of polymers, fillers, chemicals, and oils, as well understood in the art. Consequently, the rubber layer 207 completely encases the carcass 205 and belts 206 to form the conventional pneumatic tire 200.

Figure 2:
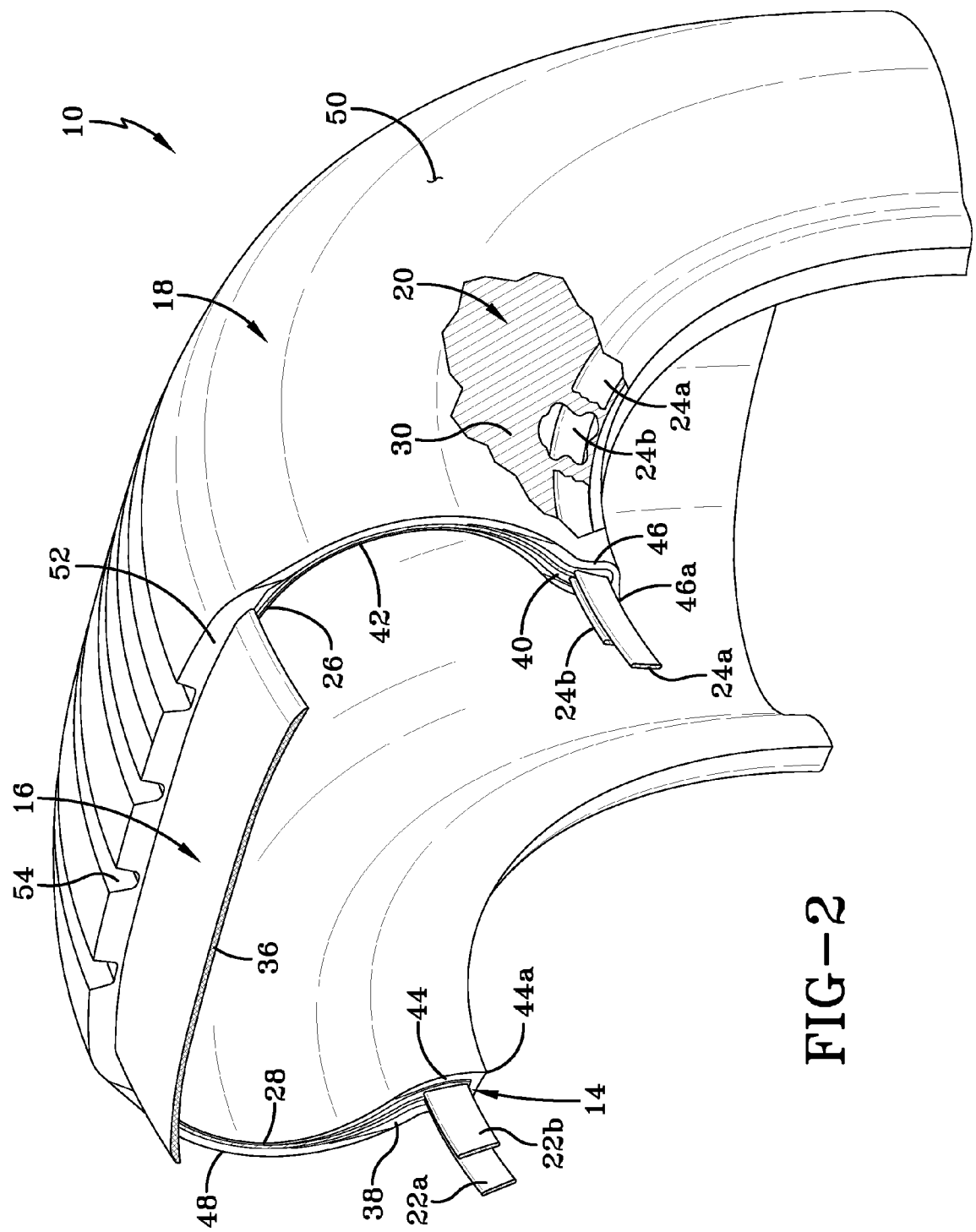
FIG. 2 is a partially cut-away perspective view of the pneumatic tire of FIG. 1.

Turning to FIGS. 1 and 2, a first embodiment of the pneumatic tire 10 of the present invention is illustrated. The pneumatic tire 10 is configured to engage a rim (not shown) of a wheel to define an air chamber 12 between the rim and the tire 10. The tire 10 includes a carcass 14, a belt 16, and a rubber layer 18 encasing the carcass 14 and the belt 16. The carcass 14 includes a continuous pressure membrane 20, a pair of first bead members 22a, 22b, and a pair of second bead members 24a, 24b. The continuous pressure membrane 20 is composed of a structural material such as polyester. For example, the continuous pressure membrane 20 may be composed of one or more layers of an extruded generally planar film of high-modulus plasticized-type polyester (e.g., polyethylene terephthalate). These planar films may have a non-isotropic orientation such that adjacent films may be stacked in alternating orientations (i.e., machine direction and transverse direction). Alternatively, the continuous pressure membrane 20 may be composed of one or more layers of other types of high strength material including Vectran® (liquid crystal polymer fiber) commercially available from Vectran Fiber, Inc. of Houston, Tex.; or Spectra® (ultra high molecular weight polyethylene fiber) commercially available from Honeywell International, Inc. of Colonial Heights, Va.

The continuous pressure membrane 20 is bent into a generally U-shaped cross-sectional configuration as shown in FIG. 1. Thus, the pressure membrane 20 includes a crown portion 26 through the equatorial plane EP of the tire 10, a first sidewall portion 28, and a second sidewall portion 30 spaced from the first sidewall portion 28 and connected to the first sidewall portion 28 by the crown portion 26. It will be understood that the tire 10 and the carcass 14 are typically symmetrical about the equatorial plane EP, and that the pressure membrane 20 is wrapped around an axis of rotation for the tire 10 to define an annular-shaped structural body.

As shown in FIG. 1, the crown portion 26 of the pressure membrane 20 is substantially flat between the first sidewall portion 28 and the second sidewall portion 30. The first sidewall portion 28 includes a free end defining a first membrane end 32 disposed adjacent to the rim of the wheel when the tire 10 is fully assembled. The first membrane end 32 is clamped between the pair of first bead members 22a, 22b as shown. In this regard, one of the first bead members 22a is located axially outward from the first membrane end 32 and the other of the first bead members 22b is located axially inward from the first membrane end 32. The pair of bead members 22a, 22b is composed of bronze-coated steel wire with a hard rubber coating. The pair of bead members 22a, 22b facilitates the transfer of loads on the pressure membrane 20 to the rim of the tire 10. It will be appreciated that the pair of first bead members 22a, 22b could alternatively be formed integrally so as to surround the first membrane end 32, or be composed of other materials in other embodiments. As most clearly shown in FIG. 1, the first sidewall portion 28 generally bows in an axially outward direction between the crown portion 26 and the first membrane end 32 to provide an area where the tire 10 can flex during operation.

In a similar manner, the second sidewall portion 30 includes a free end defining a second membrane end 34 disposed adjacent to the rim of the wheel when the tire 10 is fully assembled. The second membrane end 34 is clamped between the pair of second bead members 24a, 24b. To this end, one of the second bead members 24a is located axially outward from the second membrane end 34 and the other of the second bead members 24b is located axially inward from the second membrane end 34. The pair of second bead members 24a, 24b is also composed of bronze-coated steel wire with a hard rubber coating. The pair of second bead members 24a, 24b could alternatively be integrally formed to surround the second membrane end 34 in other embodiments. The second sidewall portion 30 also generally bows in an axially outward direction between the crown portion 26 and the second membrane end 34 to provide an area where the tire 10 can flex during operation.

As clearly seen in FIG. 2, the pressure membrane 20 does not include any plies or rivet areas between plies because the polyester material is extruded into a generally planar sheet. As a result, the pressure membrane 20 has a first predetermined puncture resistance that is constant over the entire area of the pressure membrane 20. The pressure membrane 20 does not include any weakened areas that are more susceptible to puncture, and the pressure membrane 20 also improves retention of air in the air chamber 12. Furthermore, the pressure membrane 20 is easier or simpler to manufacture than a ply construction where the plies have to be calendared, wound into position about a shell, and coated with rubber material.

After the pressure membrane 20 and bead members 22a, 22b, 24a, 24b have been assembled, the belt 16 is positioned adjacent to the crown portion 26 so as to be radially outward of the crown portion 26. The belt 16 may be composed of brass coated high tensile steel wire, as is well understood in the art. Alternatively, the belt 16 could be formed by at least one additional continuous pressure membrane 36 (hereinafter referred to as the belt membrane 36) laid over the crown portion 26 of the pressure membrane 20. The belt membrane 36 is composed of one or more thin film layers of the same high-modulus plasticized-type polyester used to form the pressure membrane 10. As the belt membrane 36 is also composed of one or more generally planar sheets of polyester, the belt membrane 36 and the crown portion 26 of the pressure membrane 20 collectively define a second predetermined puncture resistance along the entire area of the belt 16. The second predetermined puncture resistance is generally constant and higher than the first predetermined puncture resistance, thereby increasing the strength and stability of the tire 10 near the belt 16 and crown portion 26. Although only one layer of polyester material is shown in FIGS. 1 and 2 for the belt membrane 36, it will be understood that any number of layers could be used in alternative embodiments of the tire 10 to form the belt 16 for different applications.

After the belt 16 and carcass 14 have been assembled, these components are encased or surrounded by a rubber layer 18. The rubber layer 18 includes numerous portions in the embodiment illustrated in FIGS. 1 and 2. A first apex portion 38 of hardened rubber material envelops the first membrane end 32 and the pair of first bead members 22a, 22b. Similarly, a second apex portion 40 of hardened rubber envelops the second membrane end 34 and the pair of second bead members 24a, 24b. An inner liner portion 42 composed of butyl surrounds the interior side of the carcass 14 and faces axially inwardly and radially inwardly toward the air chamber 12. A first end portion 44 surrounds most of the first apex portion 38 to define a combination toe guard and chafer proximate to the first pair of bead members 22a, 22b. Likewise, a second end portion 46 surrounds most of the second apex portion 40 to define another combination toe guard and chafer. The first and second end portions 44, 46 are composed of abrasion-resistant and tear-resistant rubber such that respective tip ends 44a, 46a formed by the first and second end portions 44, 46 sealingly seat against the rim of a wheel.

The rubber layer 18 further includes a first tire sidewall 48 surrounding the first sidewall portion 28 of the pressure membrane 20 and facing axially outward from the first sidewall portion 28. The first tire sidewall 48 is composed of flexible rubber material and extends from the first end portion 44 toward the crown portion 26 of the pressure membrane 20. The rubber layer 18 also includes a second tire sidewall 50 surrounding the second sidewall portion 30 of the pressure membrane 20 and facing axially outward from the second sidewall portion 30. The second tire sidewall 50 is composed of flexible rubber material and extends from the second end portion 46 toward the crown portion 26 of the pressure membrane 20. The rubber layer 18 also includes a tire crown 52 surrounding the crown portion 26 of the pressure membrane 20 and the belt 16. The tire crown 52 is composed of a rubber including an optimized combination of polymers, fillers, chemicals, and oils, and the tire crown 52 defines a tread 54 facing radially outwardly from the tire crown 52. The tire crown 52 extends from the first tire sidewall 48 to the second tire sidewall 50, thereby completing the total encasing of the carcass 14 and belt 16 by the rubber layer 18 to form the pneumatic tire 10.

As briefly described above, the manufacturing of the pneumatic tire 10 is simplified from the manufacturing process for ply construction conventional tires 200. The tire 10 is produced by extruding a thin film of polyester material to form a continuous pressure membrane 20. The pressure membrane 20 is then bent into a generally U-shaped cross section when viewed in a circumferential perspective relative to the axis of rotation of the tire 10. The pressure membrane 20 includes the crown portion 26, the first sidewall portion 28, and the second sidewall portion 30. The pressure membrane 20 is wrapped around a tire axis so as to be a continuous annular-shaped membrane. The pressure membrane 20 is encased with the rubber layer 18 including at least the first tire sidewall 48, the second tire sidewall 50, and the tire crown 52 including the tread 54. This manufacturing process more readily forms an improved pneumatic tire 10 having superior and constant puncture resistance.

Figure 3:
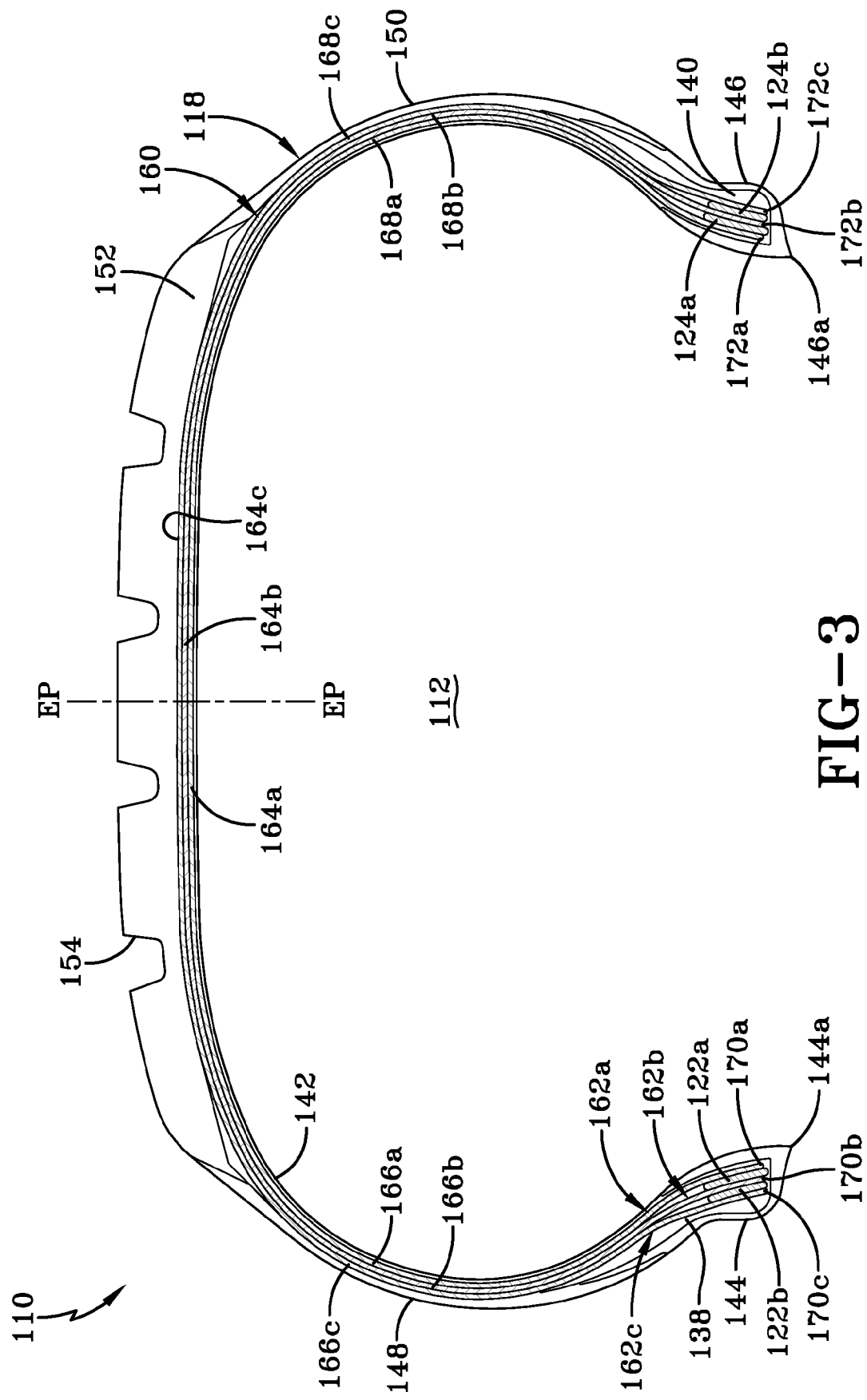
FIG. 3 is a front cross sectional view of another embodiment of a pneumatic tire according to the invention.
Figure 4:
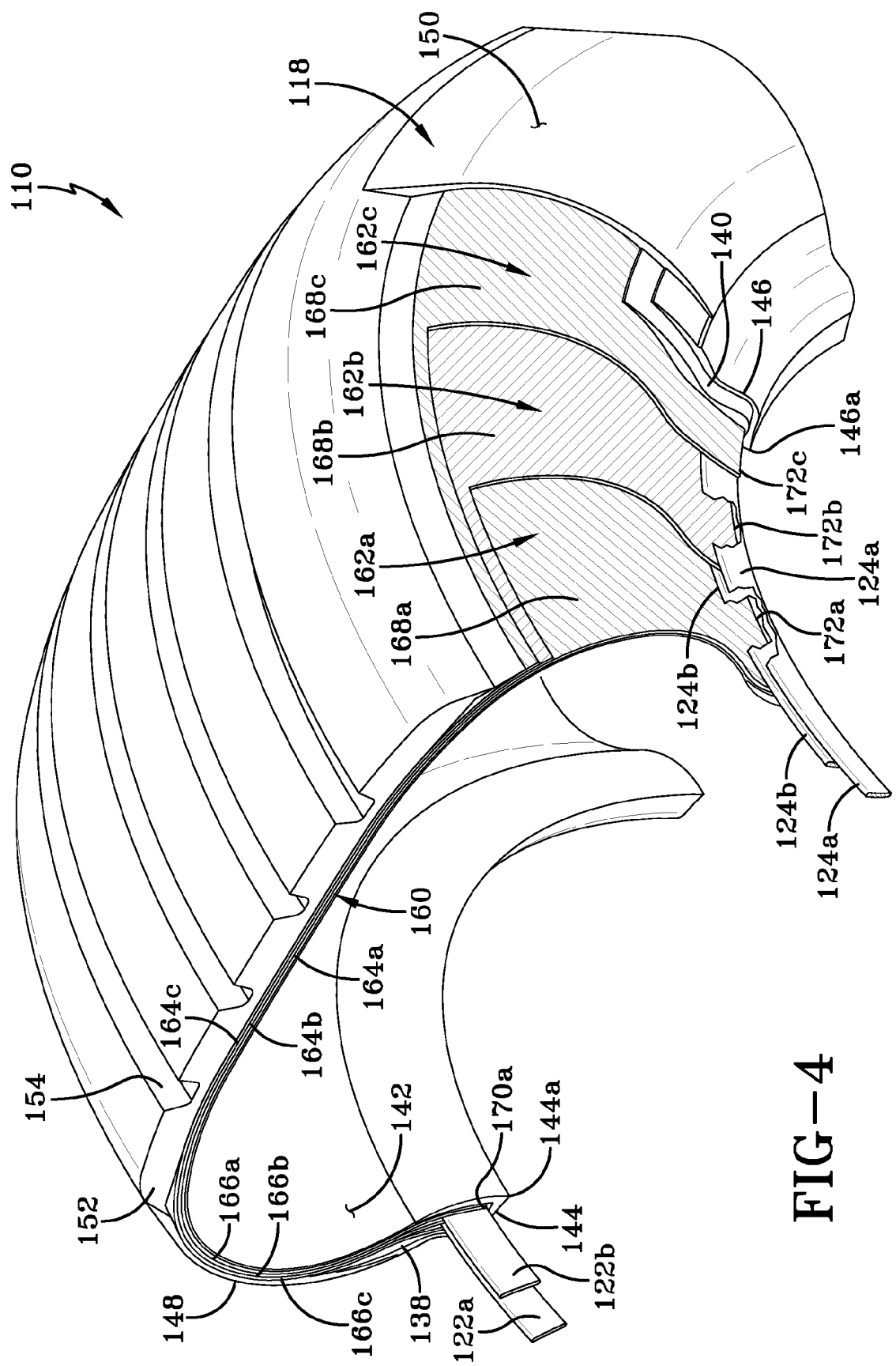
FIG. 4 is a partially cut-away perspective view of the pneumatic tire of FIG. 3.

Another embodiment of a pneumatic tire 110 according to the invention is illustrated in FIGS. 3 and 4. Many of the elements previously described in accordance with the first embodiment are substantially similar or identical in this embodiment, and those elements are provided with the same reference numbers in the 100's in FIGS. 3 and 4 (e.g., the rubber layer 118 corresponds to the previously-described rubber layer 18). The primary difference in the current embodiment is that the carcass 14 and belt 16 have been replaced with a carcass and belt assembly 160. The assembly 160 is composed of three continuous pressure membranes 162a, 162b, 162c each formed by extruding a thin film of high-modulus plasticized-type polyester into a generally planar sheet and bending that sheet into a generally U-shaped cross section including respective crown portions 164a, 164b, 164c, respective first sidewall portions 166a, 166, 166c, and respective second sidewall portions 168a, 168b, 168c. Just like the previous embodiment, the assembly 160 is surrounded or encased by a rubber layer 118 including a first apex portion 138, a second apex portion 140, an inner liner portion 142, a first end portion 144, a second end portion 146, a first tire sidewall 148, a second tire sidewall 150, and a tire crown 152 with a tread 154, thereby forming the pneumatic tire 110.

The first pressure membrane 162a is wrapped around a tire axis as shown in FIG. 4, and then the second pressure membrane 162b is laid over the first pressure membrane 162a such that the crown portion 164b of the second pressure membrane 162b is adjacent to and radially outward from the crown portion 164a of the first pressure membrane 162a. The first and second sidewall portions 166b, 168b of the second pressure membrane 162b are also adjacent to and axially outward from the respective first and second sidewall portions 166a, 168a of the first pressure membrane 162a. The third pressure membrane 162c is then laid over the second pressure membrane 162b such that the crown portion 164c of the third pressure membrane 162c is adjacent to and radially outward from the crown portion 164b of the second pressure membrane 162b. The first and second sidewall portions 166c, 168c of the third pressure membrane 162c are also adjacent to and axially outward from the respective first and second sidewall portions 166b, 168b of the second pressure membrane 162b.

As most clearly shown in FIG. 3 (but also shown by cut-away portions in FIG. 4), the tire 110 also includes a first pair of bead members 122a, 122b and a second pair of bead members 124a, 124b similar to those of the first embodiment. The first pair of bead members 122a, 122b is coupled to first membrane ends 170a, 170b, 170c defined at the free ends of the first sidewall portions 166a, 166b, 166c of the assembly 160. In this regard, one of the bead members 122a is positioned between the first membrane end 170a of the first pressure membrane 162a and the first membrane end 170b of the second pressure membrane 162b. Likewise, the other of the bead members 122b is positioned between the first membrane end 170b of the second pressure membrane 162b and the first membrane end 170c of the third pressure membrane 162c. Alternatively, the first pair of bead members 122a, 122b may clamp together the first membrane ends 170a, 170b, 170c in other embodiments without departing from the scope of the invention. The first pair of bead members 122a, 122b may also be integrally formed in other embodiments.

Similar to the first pair of bead members 122a, 122b, the second pair of bead members 124a 124b is coupled to second membrane ends 172a, 172b, 172c defined at the free ends of the second sidewall portions 168a, 168b, 168c of the assembly 160. In this regard, one of the bead members 124a is positioned between the second membrane end 172a of the first pressure membrane 162a and the second membrane end 172b of the second pressure membrane 162b. Likewise, the other of the bead members 124b is positioned between the second membrane end 172b of the second pressure membrane 162b and the second membrane end 172c of the third pressure membrane 162c. Alternatively, the second pair of bead members 124a, 124b may clamp together the second membrane ends 172a, 172b, 172c in other embodiments without departing from the scope of the invention. The second pair of bead members 124a, 124b may also be integrally formed in other embodiments.

As readily recognizable from FIGS. 3 and 4 and the above description, the carcass and belt assembly 160 is formed without plies by three planar sheets of polyester that collectively define a generally constant thickness along the U-shaped cross section of the assembly 160. Therefore, the assembly 160 has a constant and predetermined puncture resistance along the respective crown portions 164a, 164b, 164c, the first sidewall portions 166a, 166b, 166c, and the second sidewall portions 168a, 168b, 168c. The carcass and belt assembly 160 is also simpler to manufacture than corresponding layers of plies in a conventional pneumatic tire 200, for the same reasons detailed above with respect to the first embodiment.

While the present invention has been illustrated by the description of specific embodiments thereof, and while the embodiments have been described in considerable detail, it is not intended to restrict or in any way limit the scope of the appended claims to such detail. The various features discussed herein may be used alone or in any combination. Additional advantages and modifications will readily appear to those skilled in the art. For example, the inner liner portion 42 of the rubber layer 18 may be omitted in alternative embodiments of the tire 10 because the carcass 14 is formed by a continuous planar sheet. The invention in its broader aspects is therefore not limited to the specific details, representative apparatus and methods and illustrative examples shown and described. Accordingly, departures may be made from such details without departing from the scope or spirit of the general inventive concept.

What is claimed is:

1. A pneumatic tire having an axis of rotation, the pneumatic tire consisting of:
 a carcass and belt assembly consisting of a first pair of bead members, a second pair of bead members, and at least two continuous pressure membranes having a U-shaped cross section when viewed in a circumferential perspective relative to the axis of rotation of the pneumatic tire, each of the pressure membranes including a crown portion, a first sidewall portion defining a first membrane end, and a second sidewall portion defining a second membrane end and connected with the first sidewall portion by the crown portion, the crown portion and the first and second sidewall portions collectively defining the U-shaped cross section, wherein the first pair of bead members is coupled to the first membrane ends and the second pair of bead members is coupled to the second membrane ends; and a rubber layer composed of one or more rubber portions and surrounding the carcass and belt assembly, the rubber layer consisting of a tire crown with a tread, first and second apex portions of hardened rubber material enveloping the corresponding first and second membrane ends and first and second pairs of bead members, first and second end portions adjacent the first and second apex portions so as to define a combination toe guard and chafer, first and second tire sidewalls extending between the tire crown and the first and second end portions, and an inner liner portion extending between the first and second end portions, wherein each of the at least two continuous pressure membranes includes a planar layer of material that is bent into the U-shaped cross section, and any adjacent two of the continuous pressure membranes are in contact with each other along a constant thickness portion defined by the crown portions, an outermost part of the first sidewall portions, and an outermost part of the second sidewall portions, wherein the outermost parts of the first and second sidewall portions extend between the crown portion and parts adjacent the first and second pairs of bead members, such that the carcass and belt assembly has a constant thickness along the constant thickness portion and thereby defines a first predetermined puncture resistance that is constant over an entire area defined by the constant thickness portion, and wherein the pneumatic tire does not include any plies, and wherein the first and second apex portions include a radially outer end with a greater radial height than a corresponding radial outer end of the respective first and second end portions.

2. The pneumatic tire of claim 1, wherein the at least two continuous pressure membranes are composed of a polyester material.

3. The pneumatic tire of claim 2, wherein the at least two continuous pressure membranes are composed of polyethylene terephthalate.

4. The pneumatic tire of claim 1, wherein at least one of the first membrane ends is clamped between the first pair of bead members, and at least one of the second membrane ends is clamped between the second pair of bead members.

5. The pneumatic tire of claim 1, wherein the at least two continuous pressure membranes are composed of liquid crystal polymer fiber.

6. The pneumatic tire of claim 1, wherein the at least two continuous pressure membranes are composed of ultra high molecular weight polyethylene fiber polyester.

* * * * *

UNITED STATES PATENT AND TRADEMARK OFFICE
CERTIFICATE OF CORRECTION

PATENT NO. : 9,004,121 B2  
APPLICATION NO. : 12/941166  
DATED : April 14, 2015  
INVENTOR(S) : Anthony John Scarpitti et al.

It is certified that error appears in the above-identified patent and that said Letters Patent is hereby corrected as shown below:

In the Claims

Claim 6, Column 10, line 23, delete "polyester"

Signed and Sealed this
Twenty-fifth Day of August, 2015

Michelle K. Lee
*Director of the United States Patent and Trademark Office*